US010679176B2

(12) United States Patent
Goulart (10) Patent No.: US 10,679,176 B2
(45) Date of Patent: Jun. 9, 2020

(54) INVENTORY MANAGEMENT BASED ON GEOGRAPHIC INFORMATION OF USERS

(71) Applicant: Wal-Mart Stores, Inc., Bentonville, AR (US)

(72) Inventor: Valerie Goulart, Seattle, WA (US)

(73) Assignee: WALMART APOLLO, LLC, Bentonville, AR (US)

(*) Notice: Subject to any disclaimer, the term of this patent is extended or adjusted under 35 U.S.C. 154(b) by 948 days.

(21) Appl. No.: 14/501,530

(22) Filed: Sep. 30, 2014

(65) Prior Publication Data

US 2016/0092830 A1 Mar. 31, 2016

(51) Int. Cl.
*G06Q 10/08* (2012.01)
*H04W 4/021* (2018.01)

(52) U.S. Cl.
CPC .......... *G06Q 10/087* (2013.01); *H04W 4/021* (2013.01)

(58) Field of Classification Search
CPC ............................. G06Q 10/087; H04W 4/021
USPC .......................................................... 705/28
See application file for complete search history.

(56) References Cited

U.S. PATENT DOCUMENTS

| 5,765,143 A | 6/1998 | Sheldon | |
|---|---|---|---|
| 6,249,774 B1 | 6/2001 | Roden | |
| 6,341,271 B1 | 1/2002 | Salvo | |
| 7,921,029 B2 | 4/2011 | Boardman | |
| 8,260,666 B2* | 9/2012 | Kalaboukis | G06Q 20/203 |
| | | | 705/14.53 |
| 8,359,240 B2 | 1/2013 | Stevens | |
| 8,543,473 B2 | 9/2013 | An | |
| 8,620,707 B1 | 12/2013 | Belyi | |
| 2002/0010659 A1 | 1/2002 | Cruse | |
| 2002/0072988 A1* | 6/2002 | Aram | G06Q 10/087 |
| | | | 705/26.1 |
| 2005/0149414 A1 | 7/2005 | Schrodt | |
| 2007/0299747 A1 | 12/2007 | Shorter | |
| 2008/0154709 A1 | 6/2008 | Ham | |
| 2010/0070338 A1 | 3/2010 | Siotia | |
| 2011/0093324 A1* | 4/2011 | Fordyce, III | G06Q 20/10 |
| | | | 705/14.27 |
| 2011/0258014 A1* | 10/2011 | Evangelist | G06Q 10/06313 |
| | | | 705/7.23 |
| 2012/0166313 A1 | 6/2012 | Sielatycki | |
| 2013/0013368 A1 | 1/2013 | Grant, Jr. | |
| 2013/0166332 A1* | 6/2013 | Hammad | G06Q 40/10 |
| | | | 705/5 |
| 2013/0179309 A1 | 7/2013 | Heil | |
| 2014/0195374 A1 | 7/2014 | Bassemir | |

(Continued)

FOREIGN PATENT DOCUMENTS

WO  WO2000022560 A9  7/2001
WO  WO2001073671 A1  10/2001

*Primary Examiner* — Florian M Zeender
*Assistant Examiner* — Milena Racic
(74) *Attorney, Agent, or Firm* — Bryan Cave Leighton Paisner LLP (57) ABSTRACT

Example systems and methods for inventory management are described. In one implementation, a method may analyze user profiles to retrieve geographic information and user online activity information. The method may identify an offline store corresponding to the retrieved geographic information such that the method may cause inventory management associated with the offline store.

20 Claims, 3 Drawing Sheets

(56) References Cited

U.S. PATENT DOCUMENTS

| 2014/0379536 A1* | 12/2014 | Varma | G06Q 30/06 |
| | | | 705/28 |
| 2015/0254589 A1* | 9/2015 | Saxena | G06Q 10/06315 |
| | | | 705/7.25 |
| 2016/0042315 A1* | 2/2016 | Field-Darragh | G06Q 10/087 |
| | | | 705/28 |

* cited by examiner

INVENTORY MANAGEMENT BASED ON GEOGRAPHIC INFORMATION OF USERS

TECHNICAL FIELD

The present disclosure relates to methods and systems for inventory management based on geographic information of users.

BACKGROUND

Merchants normally keep a certain number of items in their inventory facilities to make the items readily available for purchase and/or delivery. For example, keeping items in inventory facilities may allow the merchants to respond quickly to variations in customer demands or in supply chains, including manufacturers and distributors. However, keeping an excessive amount of items in the inventory facilities may cause unnecessary expenses to the merchants. Therefore, it is a challenging task to balance between enhancing customer experience and lowering costs associated with stocking items in the inventory facilities.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

The articles "a" and "an" are used herein to refer to one or to more than one (i.e. to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Figure 1:
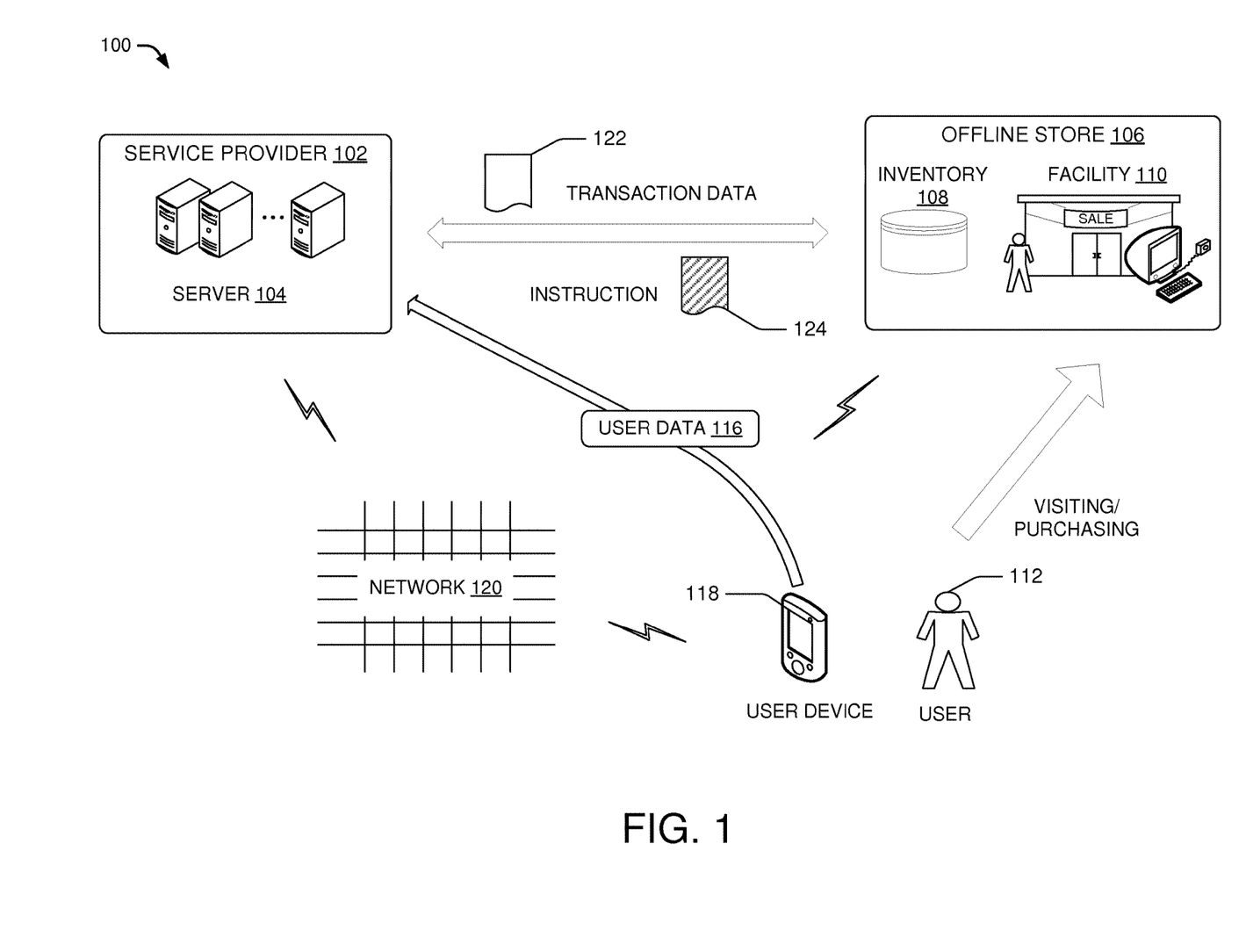
FIG. 1 is a block diagram depicting a computing environment within which an example embodiment of the present disclosure may be implemented.

FIG. 1 is a block diagram depicting a computing environment 100 within which an example embodiment of the present disclosure may be implemented. Computing environment 100 includes a server 104 associated with a service provider 102. Service provider 102 may provide a service related to inventory management for one or more consumers, such as an offline store 106. For example, the service may include a set of related software and/or hardware functionalities that, together with certain policies set by service provider 102, enable the offline store 106 to manage an inventory 108 associated with a facility 110 of the offline store 106.

In some embodiments, server 104 may generate a user profile for each of multiple users, including a user 112. In these instances, server 104 may generate the user profile based on user data 116 provided by a user device 118. For example, user 112 may use user device 118 to provide user data 116 to server 104. User data 116 may include a collection of records of user information and behavior that is, for example, associated with online and/or offline transactions of user 112. User data 116 may be obtained from store receipts, credit card purchases, mail-order requests, information inquiries, browsers, cookies, and other sources related to customer preferences or predisposition to purchasing or using an item. User data 116 may include a collection of records of user online behavior related to, for example, user online preferences or predisposition to purchasing or using an item.

After receiving user data 116, server 104 may generate the user profile. The user profile may include, for example, a collection of records of user information (e.g., user demographic information) and behavior (e.g., user activities) that are, for example, associated with one or more items (e.g., merchandise for sale at and/or sold by offline store 106). The user demographic information may include user information related to genders, ages, ethnicities, knowledge of languages, disabilities, motilities, home ownership, employment status, and/or living/working locations. The user activities may include user interactions with service provider 102. In some embodiments, an individual user activity of a user, e.g., user 112, may be monitored to generate a record of user activity history. The user profile may be obtained from store receipts, credit card purchases, mail order requests, information inquiries, browsers, cookies, and other sources related to customer preferences or predisposition associated with the one or more items. In some embodiments, the user profile may include user preference data, which may be maintained by service provider 102 in a user profile database. In some embodiments, the user profile database may include a record of history of user preferences of user 112 who interacted with service provider 102 within a predetermined period of time or in a real-time manner.

In some embodiments, the user preference data may include choices that user 112 has made with respect to the user's interests (e.g., highly likes, partially likes, dislikes, etc.). For example, the user preference data may include implicit and/or explicit information about user 112, the extent to which user 112 likes or dislikes one or more items, etc. The implicit and/or explicit information may be extracted from one or more interactions of user 112 with service provider 102 and/or other service providers. In some embodiments, explicit information may be in the form of ratings associated with one or more particular items, and implicit information may be generated by interpreting the user interaction data. For example, an online retailer website may infer that user 112 likes an item if user 112 stays on webpage related to the item for more than a predetermined period of time. In some embodiments, the user profile database may contain a collection of organized user preference data for multiple users, including user 112.

In some embodiments, a user profile may include geographic information of a respective user of the multiple users. For example, geographic information may include user information and behavior that are related to geographic location of user 112. Geographic location may indicate a relative location (e.g., Seattle or 1313 Disneyland Dr, Anaheim, Calif. 92802, etc.) as a displacement for a site or an absolute location using a coordinate system (e.g., a spherical coordinate system or a world geodetic system). Geographic information may be associated with a circumstance parameter. In some embodiments, the circumstance parameter may include a reference of a respective geographic location, weather of geographic location (e.g., rainy, cloudy, sunny, etc.), a local social event at the geographic location (e.g., basketball game, football game, etc.), a trending topic associated with the geographic location, geographic relatedness of the geographic location, activity information associated with the geographic location, and/or patterns of geographic behavior that are associated with user 112.

In some embodiments, server 104 may collect geographic information of user 112 from user device 118 via a network 120. Network 120 enables server 104 to exchange information with user device 118. Network 120 may include wired and/or wireless networks that enable communications between the various computing devices described in environment 100. In some embodiments, network 120 may include local area networks (LANs), wide area networks (WAN), mobile telephone networks (MTNs), and other types of networks, possibly used in conjunction with one another, to facilitate communication between the various computing devices (e.g., server 104 and user device 118). User device 118 may be a mobile or desktop computer, a personal data assistant (PDA), an internet appliance, an internet enabled mobile phone, a server or any other computing device configured with a network connection.

In some embodiments, server 104 may receive transaction data 122 from offline store 106. Offline store 106 is a place where items are kept for future use or sale, or a store of which a portion of the store's items are provided through a physical retail store. For example, offline store 106 may include a retail store, a restaurant, a gas station, a beauty salon, a fitness center, and/or other stores in which user 112 can visit and purchase items and/or services. In some embodiments, offline store 106 may include one or more stores having no online presence or otherwise not integrated with a networked commercial service. Offline purchase may include an acquisition activity that a consumer physically visits offline store 106 and purchases an item in offline store 106.

Offline store 106 may transmit transaction data 122 to server 104. Transaction data 122 may include specific elements of one or more transactions. For example, transactional data 122 may include pricing changes, sales orders, financial transactions, revenues, conversion rates, profits, and/or any other business transaction data associated with one or more items and/or one or more certain brands of an item. Conversion rate refers to the proportion of visitors to an offline store, e.g., offline store 106, who make a purchase.

In some embodiments, transaction data 122 may further include information associated with inventory 108 of offline store 106 in one or more facilities, including facility 110. For example, the information associated with inventory 108 may include information of inventory levels associated with an inventory item in the inventory 108. An inventory level indicates an amount of the inventory item in inventory 108. Combining with sales rate, the inventory level of the inventory item may be used to determine optimal times and activities to manage inventory 108. For example, the inventory item may be an item that is for sale and is tracked in inventory 108.

In some embodiments, server 104 may determine whether the inventory level of the inventory item is appropriate based on various factors. For example, the various factors may include a demand of the inventory item, availability information of the inventory item, and transaction data (e.g., a conversion rate) associated with the inventory item in inventory 108 within a predetermined time period. The availability information may include a time period from a time of ordering the inventory item to a time that the ordered inventory item is added to the inventory 108. The demand of the inventory item indicates willingness and/or financial ability of user 112 to pay a price for the inventory item.

In some embodiments, the demand of the inventory item may be determined based on a quantity of the inventory item that is desired by multiple users at one or more prices. In these instances, the demand of the inventory item may be measured and/or represented by a demand parameter, which may be determined and/or calculated based on analysis of user data 116. The demand parameter of the inventory item in the offline store 106 indicates willingness or financial ability of the multiple users to pay a price for the inventory item.

In some embodiments, server 104 may analyze user data 116 to generate user preference data of the multiple users. In these instances, the demand parameter of the inventory item may be determined based on the times that the multiple users place the inventory item into shopping carts associated with online purchases. For example, the online purchases may include purchasing the inventory items using a mobile app associated with the service provider 102.

In some embodiments, the various factors may further include an inventory history of the inventory item in a predetermined time. The inventory history may include, for example, a break-even point of the inventory item in the predetermined time. In these instances, break-even analysis may be used to determine the break-even point, which is the level of sales where total costs equal total revenue. For example, a break-even point indicates the point at which the total sales revenue line intersects the total cost line using a break-even chart.

Based on analysis of transaction data 122 and user data 116, server 104 may determine the demand parameter of the inventory item and the current inventory level of the inventory item in the inventory 108 associated with the offline store 106. For example, server 104 may transmit an instruction 124 to the offline store 106 to cause inventory management of the inventory item in facility 110 of offline store 106 based on the demand parameter and the current inventory level that are associated with the inventory item. For example, the server 104 may facilitate the offline store 106 to order a predefined amount of the inventory item for the offline store 106 or to physically remove a predefined amount of the inventory item from the facility 110 of the offline store. The predefined amount of the inventory item from the facility 110 may be transported to another facility, which may be determined based on transaction data and user data that are associated with another offline store associated with the other facility.

Figure 2:
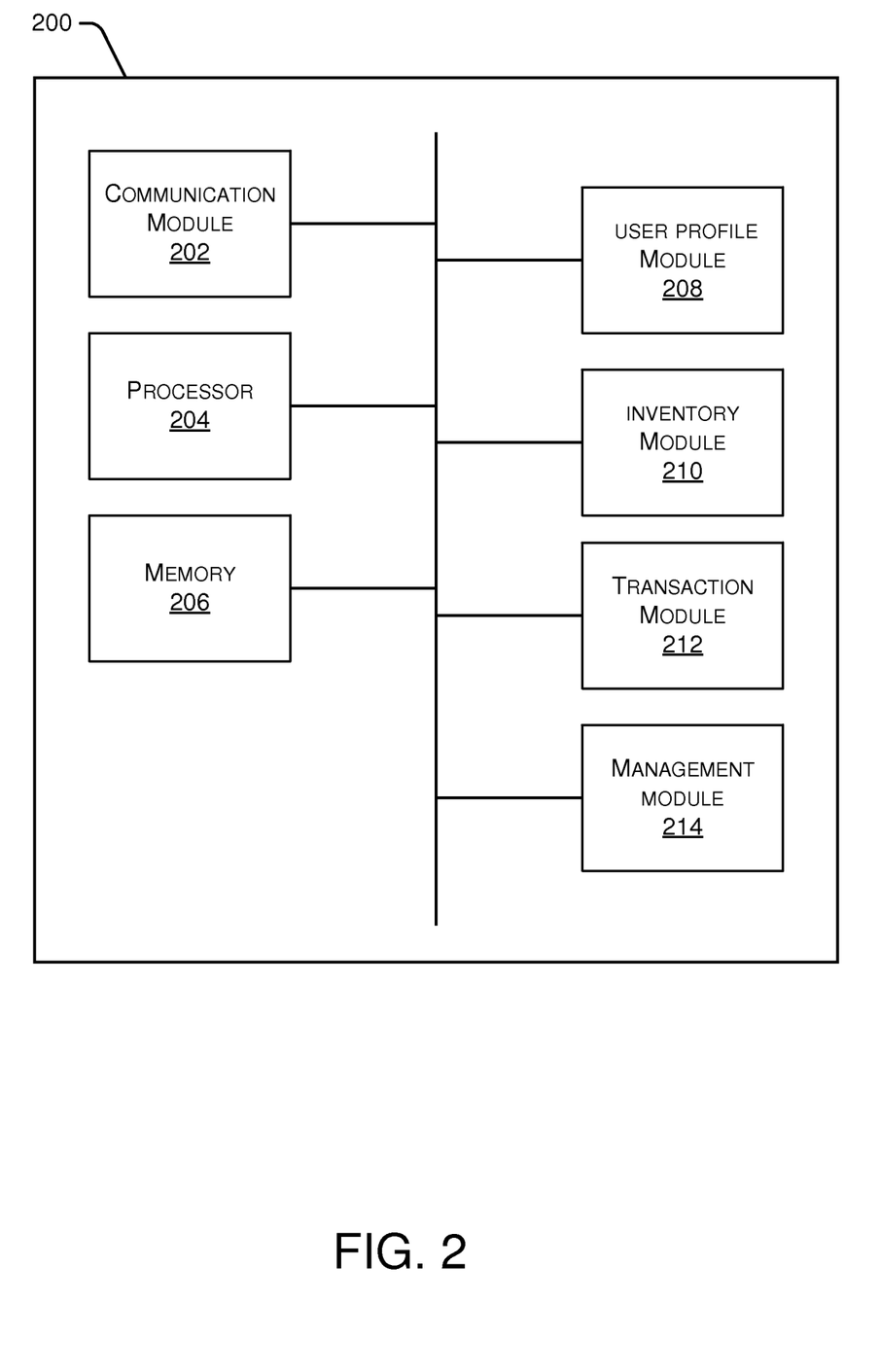
FIG. 2 is a block diagram depicting an embodiment of a computing device configured to implement systems and methods of the present disclosure.

FIG. 2 is a block diagram depicting an embodiment of a computing device 200 configured to implement systems and methods of the present disclosure. Computing device 200 (e.g., server 104) performs various functions related to recommending items based on geographic information and user activities, as discussed herein. In some embodiments, computing device 200 may be implemented as one or more computing devices that cooperatively implement the functions described herein. Computing device 200 may include a communication module 202, one or more processors (shown as a processor 204 in FIG. 2), and a memory 206. Communication module 202 allows computing device 200 to communicate with other systems, such as communication networks, other servers, etc. Processor 204 executes one or more sets of instructions to implement the functionality provided by computing device 200. Memory 206 stores those instructions executable by processor 204 as well as other data used by processor 204 and other modules contained in computing device 200, such as a user profile module 208, an inventory module 210, a transaction module 212, and a management module 214.

Computing device 200 may include user profile module 208 configured to receive and/or collect user data 116 via user device 118. In some embodiments, user profile module 208 may track user online activities of multiple users, and extract, based on the user online activities, user preference data of the multiple users that is associated with an inventory item. For example, the user preference data may include times that at least a portion of the multiple users place the inventory item into shopping carts associated with online purchases.

In some embodiments, the user profiles of the multiple users may include geographic information associated with multiple mobile devices of the multiple users. For example, the geographic location may be represented by global positioning system (GPS) coordinates or a street address.

Computing device 200 may include transaction module 212 configured to receive and/or collect transaction data 122 from offline store 106. Transaction module 212 may calculate a conversion rate of the inventory item in offline store 106 in a predetermined time. For example, the conversion rate may indicate a proportion of the multiple users visiting offline store 106 who make a purchase of the inventory item.

Computing device 200 may include inventory module 210 configured to analyze the user profiles of the multiple users to retrieve geographic information and the information of user online activities that are associated with the multiple users. For example, the geographic information may indicate a geographic location associated with the multiple users, and the information of user online activities is associated with an inventory item.

In some embodiments, inventory module 210 may identify an offline store (e.g., offline store 106) corresponding to the geographic location. For example, inventory module 210 may obtain the geographic information associated with the multiple users such as to generate multiple geographic behavior patterns of the multiple users. In these instances, inventory module 210 may determine multiple geographic locations shared by the multiple users based on the multiple geographic behavior patterns, such that inventory module 210 may further determine the offline store 106 corresponding to the geographic location of the multiple geographic locations.

In some embodiments, inventory module 210 may further determine a demand parameter of the inventory item in offline store 106 based at least in part on the information of user online activities. The demand parameter of the inventory item in the offline store indicates willingness or financial ability of the multiple users to pay a price for the inventory item. In these instances, inventory module 210 may determine the demand parameter of the inventory item in offline store 106 based at least in part on the user preference data associated with the inventory item. After identifying offline store 106, inventory module 210 may further determine a current inventory level of the inventory item in inventory 108 associated with offline store 106. For example, the inventory level indicates an amount of the inventory item in inventory 108.

Computing device 200 may include management module 214 configured to cause inventory management of the inventory item in facility 110 based on various parameters. For example, the various parameters may include the demand parameter of the inventory item and the current inventory level of the inventory item in inventory 108. In some embodiments, management module 214 may cause the management of the inventory item in inventory 108 based on the demand parameter of the inventory item, the current inventory level, and the conversion rate of the inventory item in the offline store 106. For example, management module 214 may provide an instruction to offline store 106 to order a predefined amount of the inventory item, or physically remove a predefined amount of the inventory item from facility 110. The predefined amount of the inventory item may be physically stored in facility 110.

Figure 3:
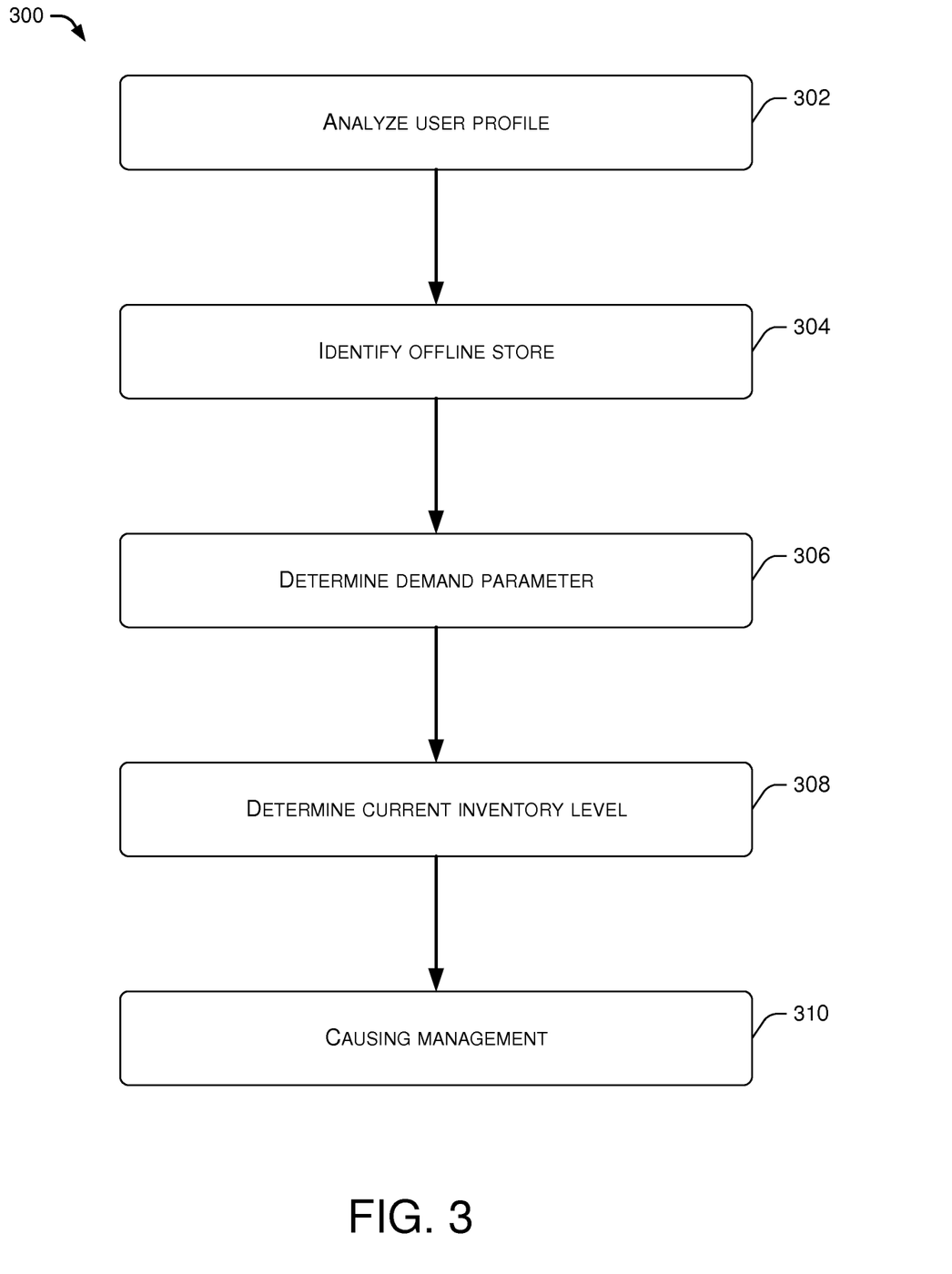
FIG. 3 is a flowchart diagram of an embodiment of a process for inventory management based on geographic information of users.

FIG. 3 is a flowchart diagram of an embodiment of a process 300 for inventory management based on geographic information of users. Example process 300 includes one or more operations, actions, or functions. Although illustrated as discrete blocks, various blocks may be divided into additional blocks, combined into fewer blocks, or eliminated, depending on the desired implementation. Process 300 may be implemented by one or more processors including, for example, computing device 200. For illustrative purposes, the operations described below are performed by one or more processors of server 104 as shown in FIG. 1 and/or processor 204 of computing device 200 as shown in FIG. 2.

At 302, one or more processors of server 104 may analyze the user profiles of the multiple users to retrieve geographic information and the information of user online activities that are associated with the multiple users. For example, the geographic information may indicate a geographic location associated with the multiple users, and the information of user online activities is associated with an inventory item.

In some embodiments, the one or more processors of server 104 may track user online activities of multiple users, and extract, based on the user online activities, user preference data of the multiple users that is associated with the inventory item. For example, the user preference data may include times that at least a portion of the multiple users place the inventory item into shopping carts associated with online purchases. In some embodiments, the user profiles of the multiple users may include geographic information associated with multiple mobile devices of the multiple users. For example, the geographic location may be represented by global positioning system (GPS) coordinates or a street address.

At 304, the one or more processors of server 104 may identify an offline store (e.g., offline store 106) corresponding to the geographic location. For example, the one or more processors of server 104 may obtain the geographic information associated with the multiple users, such that the one or more processors of server 104 may generate multiple geographic behavior patterns of the multiple users. In these instances, the one or more processors of server 104 may determine multiple geographic locations shared by the multiple users based on the multiple geographic behavior patterns, such that the one or more processors of server 104 may further determine the offline store 106 corresponding to the geographic location of the multiple geographic locations.

At 306, the one or more processors of server 104 may further determine a demand parameter of the inventory item in offline store 106 based at least in part on the information of user online activities. The demand parameter of the inventory item in the offline store indicates willingness or financial ability of the multiple users to pay a price for the inventory item. In these instances, the one or more processors of server 104 may determine the demand parameter of the inventory item in office store 106, including facility 110, based at least in part on the user preference data associated with the inventory item.

At 308, after identifying offline store 106, the one or more processors of server 104 may further determine a current inventory level of the inventory item in inventory 108. In some embodiments, the one or more processors of server 104 may receive and/or collect transaction data 122 from offline store 106. Transaction data 122 may include a conversion rate of the inventory item in offline store 106 in a predetermined time. For example, the conversion rate may indicate a proportion of the multiple users visiting the offline store 106 who make a purchase of the inventory item.

At 310, the one or more processors of server 104 may cause inventory management of the inventory item in facility 110 based on the demand parameter of the inventory item and the current inventory level of the inventory item in the inventory 108. In some embodiments, The one or more processors of server 104 may cause the management of the inventory item in the inventory 108 based on the demand parameter of the inventory item, the current inventory level, and the conversion rate of the inventory item in the offline store 106.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method for managing an inventory, the method comprising:
   generating, by a computer system using one or more processors of a server, a user profile of a user of a plurality of users based on at least user data, wherein the user data comprises a collection of records associated with online user activities of the user, at least geographic information collected from a user device, and offline user activities of the user, wherein (a) the geographic information comprises at least a geographic location associated with multiple user devices of the plurality of users, (b) the online user activities are associated with an inventory item of one or more inventory items, and (c) the offline user activities are associated with the inventory item of the one or more inventory items stored at an offline store of one or more offline stores, wherein the offline store comprises a physical store;

tracking, by the one or more processors, the online user activities of the user of the plurality of users and the offline user activities of the user of the plurality of users, wherein the offline user activities further comprise (a) transactions made at the offline store of the one or more offline stores and (b) one or more interactions of the user of the plurality of users with one or more retailers within a pre-determined period of time;

determining, by the one or more processors, user preference data of the user for the inventory item based on at least the tracking of the one or more interactions of the user of the plurality of users with the one or more retailers within the pre-determined period of time;

storing, by the one or more processors, the user preference data of the user stored in the user profile of the user;

retrieving, by the one or more processors, preferences based on the user preference data of the user for the inventory item associated with a particular geographic location to generate geographic behavior patterns of the user;

identifying, by the one or more processors, the offline store of the one or more offline stores corresponding to the particular geographic location based on at least the geographic behavior patterns of the user;

receiving, by the one or more processors, transaction data from the offline store of the one or more offline stores comprising price changes, revenues, conversion rates, profits, or an inventory level related to the inventory item of the one or more inventory items at the offline store;

determining, by the one or more processors, a demand parameter of the inventory item in the offline store based at least in part on (i) a price paid by the plurality of users for the inventory item of the one or more inventory items, and (ii) the online user activities of the plurality of users, the transaction data of the offline store, and geographic behavior patterns of the plurality of users, wherein the online user activities of the plurality of users comprise the online user activities of the user, wherein the transaction data of the offline store comprises the offline user activities of the user, and wherein the geographic behavior patterns of the plurality of users comprises the geographic behavior patterns of the user;

determining, by the one or more processors, a current inventory level of the inventory item in an inventory associated with the offline store;

calculating, by the one or more processors, an adjusted inventory level for the current inventory level of the inventory item associated with the offline store based on the demand parameter of the inventory item in the offline store based at least in part on the online user activities;

determining, by the one or more processors, whether the current inventory level at least meets the adjusted inventory level; and responsive to determining that the current inventory level does not at least meet the adjusted inventory level, causing, by the one or more processors, management of the inventory item in the offline store to meet the adjusted inventory level of the inventory item in the inventory associated with the offline store, wherein the causing the management of the inventory item in the offline store comprises:

transmitting, by the one or more processors, instructions to the offline store to adjust the current inventory level of the inventory item by at least one of (a) ordering a pre-defined amount of the inventory item for a pre-determined period of time for the offline store or (b) transporting a pre-defined amount of the inventory item to another geographic location of another offline store of the one or more offline stores.

2. The method of claim 1, wherein user profiles of the plurality of users further comprise the geographic information associated with the multiple user devices of the plurality of users, and wherein the user profiles of the plurality of users comprise the user profile of the user.

3. The method of claim 1, wherein the geographic location is represented by at least one of global positioning system (GPS) coordinates or a street address.

4. The method of claim 1, wherein determining the demand parameter of the inventory item in the offline store further comprises determining the demand parameter of the inventory item in the offline store based at least in part on the user preference data of the user associated with the inventory item.

5. The method of claim 1, wherein the user preference data of the user further comprises the online user activities of the user, and wherein at least a portion of the plurality of users place the inventory item into shopping carts associated with their respective online purchases.

6. The method of claim 1, wherein the identifying the offline store of the one or more offline stores corresponding to the particular geographic location further comprises:

obtaining, by the one or more processors, geographic information associated with the plurality of users;

generating, by the one or more processors, the plurality of geographic behavior patterns of the user of the plurality of users and other users of the plurality of users;

determining, by the one or more processors, a plurality of geographic locations shared by the plurality of users based on the plurality of geographic behavior patterns of the plurality of users; and determining, by the one or more processors, the offline store corresponding to the geographic location of the plurality of geographic locations.

7. The method of claim 1, further comprising:

calculating, by the one or more processors, a conversion rate of the inventory item in the offline store of the one or more offline stores in a pre-determined time period, wherein the conversion rate comprises a proportion of users of the offline store who make a purchase of the inventory item.

8. The method of claim 1, wherein the causing the management of the inventory item in the offline store is further based on the demand parameter of the inventory item, the current inventory level of the inventory item, and the conversion rate of the inventory item.

9. The method of claim 1, wherein the causing the management of the inventory item in the offline store of the one or more offline stores further comprises transmitting, by the one or more processors, instructions to the offline store to adjust the current inventory level of the inventory item by physically removing a predefined amount of the inventory item from a facility to the offline store.

10. The method of claim 1, wherein the demand parameter of the inventory of the offline store of the one or more offline stores is based, at least in part, on availability information of the inventory item.

11. The method of claim 1, further comprises:
determining a demand for the inventory item based on a quantity of the inventory item desired by multiple users at one or more prices, wherein:
  the demand parameter measures the demand for the inventory item by analyzing data from the plurality of users; and
  the demand parameter further comprises a financial ability of the plurality of users to pay a price for the inventory item.

12. A system comprising:
one or more processors; and
one or more non-transitory computer-readable media storing computing instructions configured to run on the one or more processors and perform:
  generating a user profile of a user of a plurality of users based on at least user data, wherein the user data comprises a collection of records associated with online user activities of the user, at least geographic information collected from a user device, and offline user activities of the user, wherein (a) the geographic information comprises at least a geographic location associated with multiple user devices of the plurality of users, (b) the online user activities are associated with an inventory item of one or more inventory items, and (c) the offline user activities are associated with the inventory item of the one or more inventory items stored at an offline store of one or more offline stores, wherein the offline store comprises a physical store;
  tracking, by the one or more processors, the online user activities of the user of the plurality of users and the offline user activities of the user of the plurality of users, wherein the offline user activities further comprise (a) transactions made at the offline store of the one or more offline stores and (b) one or more interactions of the user of the plurality of users with one or more retailers within a pre-determined period of time
  determining user preference data of the user for the inventory item based on at least the tracking of the one or more interactions of the user of the plurality of users with the one or more retailers within the pre-determined period of time;
  storing the user preference data of the user stored in the user profile of the user;
  retrieving preferences based on the user preference data of the user for the inventory item associated with a particular geographic location to generate geographic behavior patterns of the user;
  identifying the offline store of the one or more offline stores corresponding to the particular geographic location based on at least the geographic behavior patterns of the user;
  receiving transaction data from the offline store of the one or more offline stores comprising price changes, revenues, conversion rates, profits, or an inventory level related to the inventory item of one or more inventory items at the offline store;
  determining a demand parameter of the inventory item in the offline store based at least in part on (i) a price paid by the plurality of users for the inventory item of the one or more inventory items, and (ii) the online user activities of the plurality of users, the transaction data of the offline store, and geographic behavior patterns of the plurality of users, wherein the online user activities of the plurality of users comprise the online user activities of the user, wherein the transaction data of the offline store comprises the offline user activities of the user, and wherein the geographic behavior patterns of the plurality of users comprises the geographic behavior patterns of the user;
  determining a current inventory level of the inventory item in an inventory associated with the offline store;
  calculating an adjusted inventory level for the current inventory level of the inventory item associated with the offline store based on the demand parameter of the inventory item in the offline store based at least in part on the online user activities;
  determining whether the current inventory level at least meets the adjusted inventory level; and
  responsive to determining that the current inventory level does not at least meet the adjusted inventory level, causing, by the one or more processors, management of the inventory item in the offline store to meet the adjusted inventory level of the inventory item in the inventory associated with the offline store, wherein the causing the management of the inventory item in the offline store comprises:
    transmit instructions to the offline store to adjust the current inventory level of the inventory item by at least one of (a) ordering a pre-defined amount of the inventory item for a pre-determined period of time for the offline store or (b) transporting a pre-defined amount of the inventory item to another geographic location of another offline store of the one or more offline stores.

13. The system of claim 12, wherein user profiles of the plurality of users further comprise the geographic information associated with the multiple user devices of the plurality of users, and wherein the user profiles of the plurality of users comprise the user profile of the user.

14. The system of claim 12, wherein the identifying the offline store of the one or more offline stores corresponding to the geographic location further comprises:
  obtaining the geographic information associated with the plurality of users;
  generating the plurality of geographic behavior patterns of the plurality of users;
  determining a plurality of geographic locations shared by the plurality of users based on the plurality of geographic behavior patterns of the plurality of users; and
  determining the offline store corresponding to the geographic location of the plurality of geographic locations.

15. The system of claim 12, wherein the computing instructions are further configured to perform:
  calculating a conversion rate of the inventory item in the offline store of the one or more offline stores in a pre-determined time period, wherein the conversion rate comprises a proportion of the plurality of users of the offline store who make a purchase of the inventory item.

16. The system of claim 12, wherein the computing instructions are further configured to perform:
  providing the instructions to manage the inventory item in the inventory of the offline store based on the demand parameter of the inventory item, the current inventory level of the inventory item, and the conversion rate of the inventory item.

17. The system of claim 12, wherein the computing instructions are further configured to perform:

determining a demand for the inventory item based on a quantity of the inventory item desired by multiple users at one or more prices, wherein:
the demand parameter measures the demand for the inventory item by analyzing data from the plurality of users; and
the demand parameter further comprises a financial ability of the plurality of users to pay a price for the inventory item.

18. An apparatus comprising:
a memory configured to store data and one or more sets of instructions; and
one or more processors coupled to the memory, the one or more processors configured to execute the one or more sets of instructions and perform operations comprising:
generating a user profile of a user of a plurality of users based on at least user data, wherein the user data comprises a collection of records associated with online user activities of the user, at least geographic information collected from a user device, and offline user activities of the user, wherein (a) the geographic information comprises at least a geographic location associated with multiple user devices of the plurality of users, (b) the online user activities are associated with an inventory item of one or more inventory items, and (c) the offline user activities are associated with the inventory item of the one or more inventory items stored at an offline store of one or more offline stores, wherein the offline store comprises a physical store;
tracking, by the one or more processors, the online user activities of the user of the plurality of users and the offline user activities of the user of the plurality of users, wherein the offline user activities further comprise (a) transactions made at the offline store of the one or more offline stores and (b) one or more interactions of the user of the plurality of users with one or more retailers within a pre-determined period of time;
determining user preference data of the user for the inventory item based on at least the tracking of the one or more interactions of the user of the plurality of users with the one or more retailers within the pre-determined period of time;
storing the user preference data of the user stored in the user profile of the user;
retrieving preferences based on the user preference data of the user for the inventory item associated with a particular geographic location to generate geographic behavior patterns of the user;
identifying the offline store of the one or more offline stores corresponding to the particular geographic location based on at least the geographic behavior patterns of the user;
receiving transaction data from the offline store of the one or more offline stores comprising price changes, revenues, conversion rates, profits, or an inventory level related to the inventory item of the one or more inventory items at the offline store;
determining a demand parameter of the inventory item in the offline store based at least in part on (i) a price paid by the plurality of users for the inventory item of the one or more inventory items, and (ii) the online user activities of the plurality of users, the transaction data of the offline store, and geographic behavior patterns of the plurality of users, wherein the online user activities of the plurality of users comprise the online user activities of the user, wherein the transaction data of the offline store comprises the offline user activities of the user, and wherein the geographic behavior patterns of the plurality of users comprises the geographic behavior patterns of the user;
determining a current inventory level of the inventory item in an inventory associated with the offline store;
calculating an adjusted inventory level for the current inventory level of the inventory item associated with the offline store based on the demand parameter of the inventory item in the offline store based at least in part on the online user activities;
determining whether the current inventory level at least meets the adjusted inventory level; and
responsive to determining that the current inventory level does not at least meet the adjusted inventory level, causing, by the one or more processors, management of the inventory item in the offline store to meet the adjusted inventory level of the inventory item in the inventory associated with the offline store, wherein the causing the management of the inventory item in the offline store comprises:
transmitting instructions to the offline store to adjust the current inventory level of the inventory item by at least one of (a) ordering a pre-defined amount of the inventory item for a pre-determined period of time for the offline store or (b) transporting a pre-defined amount of the inventory item to another geographic location of another offline store of the one or more offline stores.

19. The apparatus of claim 18, wherein the identifying the offline store of the one or more offline stores corresponding to the geographic location further comprises:
obtaining the geographic information associated with the plurality of users;
generating the plurality of geographic behavior patterns of the plurality of users;
determining a plurality of geographic locations shared by the plurality of users based on the plurality of geographic behavior patterns of the plurality of users; and
determining the offline store corresponding to the geographic location of the plurality of geographic locations.

20. The apparatus of claim 18, wherein the demand parameter of the inventory of the offline store of the one or more offline stores is based, at least in part, on availability information of the inventory item.

* * * * *